(12) United States Patent
Bonas (10) Patent No.: US 12,008,345 B2
(45) Date of Patent: Jun. 11, 2024

(54) SPLIT TESTING ASSOCIATED WITH DETECTION OF USER INTERFACE (UI) MODIFICATIONS

(71) Applicant: Red Hat Israel, Ltd., Ra'anana (IL)

(72) Inventor: Alissa Bonas, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/250,344

(22) Filed: Jan. 17, 2019

(65) Prior Publication Data

US 2020/0233648 A1 Jul. 23, 2020

(51) Int. Cl.
*G06F 8/38* (2018.01)
*G06F 8/33* (2018.01)
*G06F 8/60* (2018.01)
*G06F 8/71* (2018.01)

(52) U.S. Cl.
CPC ............... *G06F 8/38* (2013.01); *G06F 8/33* (2013.01); *G06F 8/60* (2013.01); *G06F 8/71* (2013.01)

(58) Field of Classification Search
CPC ..... G06F 8/38; G06F 8/33; G06F 8/60; G06F 8/71
See application file for complete search history.

(56) References Cited

U.S. PATENT DOCUMENTS

| | | | | |
|---|---|---|---|---|
| 6,222,535 | B1 * | 4/2001 | Hurd, II | G06Q 10/10 709/205 |
| 9,077,780 | B2 | 7/2015 | Dixon et al. | |
| 9,213,625 | B1 * | 12/2015 | Schrage | G06F 11/3688 |
| 9,436,580 | B2 | 9/2016 | Manion et al. | |
| 2005/0188357 | A1 * | 8/2005 | Derks | G06F 11/3692 717/124 |
| 2007/0136024 | A1 * | 6/2007 | Moser | G06F 11/3688 702/186 |
| 2008/0127138 | A1 * | 5/2008 | Yard | G06F 8/71 717/141 |
| 2009/0281989 | A1 * | 11/2009 | Shukla | G06F 16/972 |
| 2012/0117545 | A1 * | 5/2012 | Yokoi | G06F 11/3684 717/126 |

(Continued)

FOREIGN PATENT DOCUMENTS

CN 107766235 3/2018

OTHER PUBLICATIONS

David Georg Reichelt; Stefan Kühne, How to Detect Performance Changes in Software History: Performance Analysis of Software System Versions, Apr. 9-13, 2008, Universität Leipzig, Leipzig, Germany, https://dl.acm.org/citation.cfm?id=3186404.

(Continued)

*Primary Examiner* — Michael Roswell
(74) *Attorney, Agent, or Firm* — Dority & Manning, P.A.

(57) ABSTRACT

An example method of providing a notification includes comparing a first code segment stored in a first page with a second code segment stored in a second page, before deployment of the second page in a production environment. The first page may be deployed in the production environment, and the second page may be a different version of the first page. The method also includes detecting a user interface (UI) modification based on comparing the first code segment with the second code segment. The method further includes providing a notification of the UI modification.

20 Claims, 7 Drawing Sheets

(56) References Cited

U.S. PATENT DOCUMENTS

| | | | |
|---|---|---|---|
| 2013/0268841 A1* | 10/2013 | Kummer | G06F 40/143 |
| | | | 715/234 |
| 2014/0278198 A1* | 9/2014 | Lyon | G06Q 30/0201 |
| | | | 702/179 |
| 2014/0282049 A1* | 9/2014 | Lyon | G06F 3/0484 |
| | | | 715/744 |
| 2015/0169434 A1* | 6/2015 | De Angelis | G06F 11/3688 |
| | | | 717/126 |
| 2017/0279910 A1* | 9/2017 | Maria | H04L 67/2809 |
| 2018/0150543 A1 | 5/2018 | Shacham et al. | |
| 2018/0217923 A1* | 8/2018 | Rossler | G06F 11/3692 |
| 2018/0307589 A1 | 10/2018 | Falkenberg et al. | |

OTHER PUBLICATIONS

Stas Negara, Mihai Codoban, Danny Dig, Ralph E. Johnson, Mining Fine-Grained Code Changes to Detect Unknown Change Patterns, University of Illinois, Oregon State University, https://www.ideals.illinois.edu/bitstream/handle/2142/45825/Mining%20Fine-Grained%20Code%20Changes%20to%20Detect%20Unknown%20Change%20Patterns.pdf?sequence=3.

* cited by examiner

Your Cart:

Item 1:    Dress: Size M

Item 2:    Shoes: Size 7

| Item | Description | Unit Cost | Quantity | Line Total |
|---|---|---|---|---|
| 1 | Dress | $100 | 1 | $100 |
| 2 | Shoes | $250 | 1 | $250 |

PURCHASE ~306

Your Cart:

Item 1:   Dress: Size M

Item 2:   Shoes: Size 7

| Item | Description | Unit Cost | Quantity | Line Total |
|---|---|---|---|---|
| 1 | Dress | $100 | 1 | $100 |
| 2 | Shoes | $250 | 1 | $250 |

SPLIT TESTING ASSOCIATED WITH DETECTION OF USER INTERFACE (UI) MODIFICATIONS

BACKGROUND

The present disclosure generally relates to computing devices, and more particularly to split testing.

Split testing is a method of conducting controlled, randomized experiments with the goal of improving a website metric, such as clicks, form completions, or purchases. Split testing may also be referred to as A/B testing or multivariate testing. Using split testing, multiple versions of a web site (or individual elements of a website) may be examined against each other to see which works best and is more effective for the goal of the testers.

BRIEF DESCRIPTION OF THE DRAWINGS

In the figures, elements having the same designations have the same or similar functions.

SUMMARY

According to one example, a method of providing a notification includes comparing a first code segment stored in a first page with a second code segment stored in a second page, before deployment of the second page in a production environment, the first page being deployed in the production environment, and the second page being a different version of the first page; detecting a user interface (UI) modification based on comparing the first code segment with the second code segment; and providing a notification of the UI modification.

According to one example, a system for providing a notification includes a user interface (UI) detection engine that compares a first code segment stored in a first page with a second code segment stored in a second page, before deployment of the second page in a production environment. The UI detection engine detects a UI modification based on comparing the first code segment with the second code segment. The first page is deployed in the production environment, and the second page is a different version of the first page. The system also includes a notification engine that provides a notification of the UI modification.

A machine-readable medium including a plurality of machine-readable instructions that when executed by one or more processors is adapted to cause the one or more processors to perform a method including: comparing a first code segment stored in a first page with a second code segment stored in a second page, before deployment of the second page in a production environment, the first page being deployed in the production environment, and the second page being a different version of the first page; detecting a UI modification based on comparing the first code segment with the second code segment; and providing a notification of the UI modification.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A split test may start with a control, which is the original version of a test object (e.g., website, web application, and so on.). Split testing may also be referred to as A/B testing or multivariate testing. To start the split test, one or more revised versions of an original may be obtained and tested against the control. For example, an original webpage and the one or more versions of the original webpage may be shown to different visitors during the same period. The original webpage and the one or more versions may be tested against each other to determine which performs better in terms of metrics (e.g., conversion rate). A conversion is any action that is desirable for users visiting the web application to complete, such as signing up for an email newsletter, buying a product, signing up for an account, posting comments, and so on.

In the fast-paced world of web applications and information, more and more changes are sent rapidly to production systems, and parts of a web application may be frequently updated at different times. Nowadays, changes to a web application may be dynamic, frequent, and automatic, providing information to users 24/7. Developers may develop code for a web application and may revise particular aspects of it. For example, a developer may apply modifications such as bolding or italicizing a title displayed on a webpage. In another example, the developer may modify the color of a button displayed on a webpage. The developer may revise code in the original webpage and accordingly generate a version of the webpage, while not being aware that UI features were modified during this process.

Further, large teams may be assigned specific tasks for developing the web application. Often times, the developer is not the same person who is tasked with deploying the web application in a production environment or analyzing statistics based on usage. For example, an administration team may be tasked with deployment of the web application in the production environment and collection of statistics to determine what users like. Team members may work in silos and not in cross-functional teams, truly unaware of modifications that influence the user interface (UI) of webpages. Accordingly, the administrator may be unaware of the different web application versions and accordingly unaware that they may be amenable to split testing.

A solution to a problem of an administrator being unaware of a UI modification based on different versions of a webpage may involve providing a visual notification system that analyzes the code of the original and variant webpages for modifications that influence the UI, before deploying the variant. For example, after a new version of a webpage (e.g., updated code) has been approved and merged into a repository used to build the application, the updated code may be built into the application and sent to the system for deployment. Before the new version of the webpage is deployed, the visual notification system may inform a system administrator about any changes that potentially might influence the web application or effectiveness of the web application (e.g., UI conversion rates, and so on), and act accordingly to propose or execute split testing based on the already-deployed original and the not-yet-deployed variant. By performing the split testing, visibility into the nature of changes and releases may be provided along with information regarding user effectiveness.

In some examples, a method of providing a notification includes comparing a first code segment stored in a first page with a second code segment stored in a second page, before deployment of the second page in a production environment. A web application may have different versions, where a first instance of the web application includes a plurality of webpages including the first page and a second instance of the web application includes a plurality of webpages including the second page. The first page may be a different version of the second page and may be deployed in the production environment. The method includes detecting a UI modification based on comparing the first code segment with the second code segment. The first and second code segments may be written in, for example, JavaScript, TypeScript, hypertext markup language (HTML), Cascading Style Sheets (CSS), or other programming or markup languages that may influence the UI of a webpage. The UI modifications may be based on the code segments in an HTML, CSS, or other file. The method further includes providing a notification of the UI modification.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "receiving," "detecting," "comparing," "performing," "sending," "executing," "rendering," "modifying," "collecting," "identifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

Figure 1:
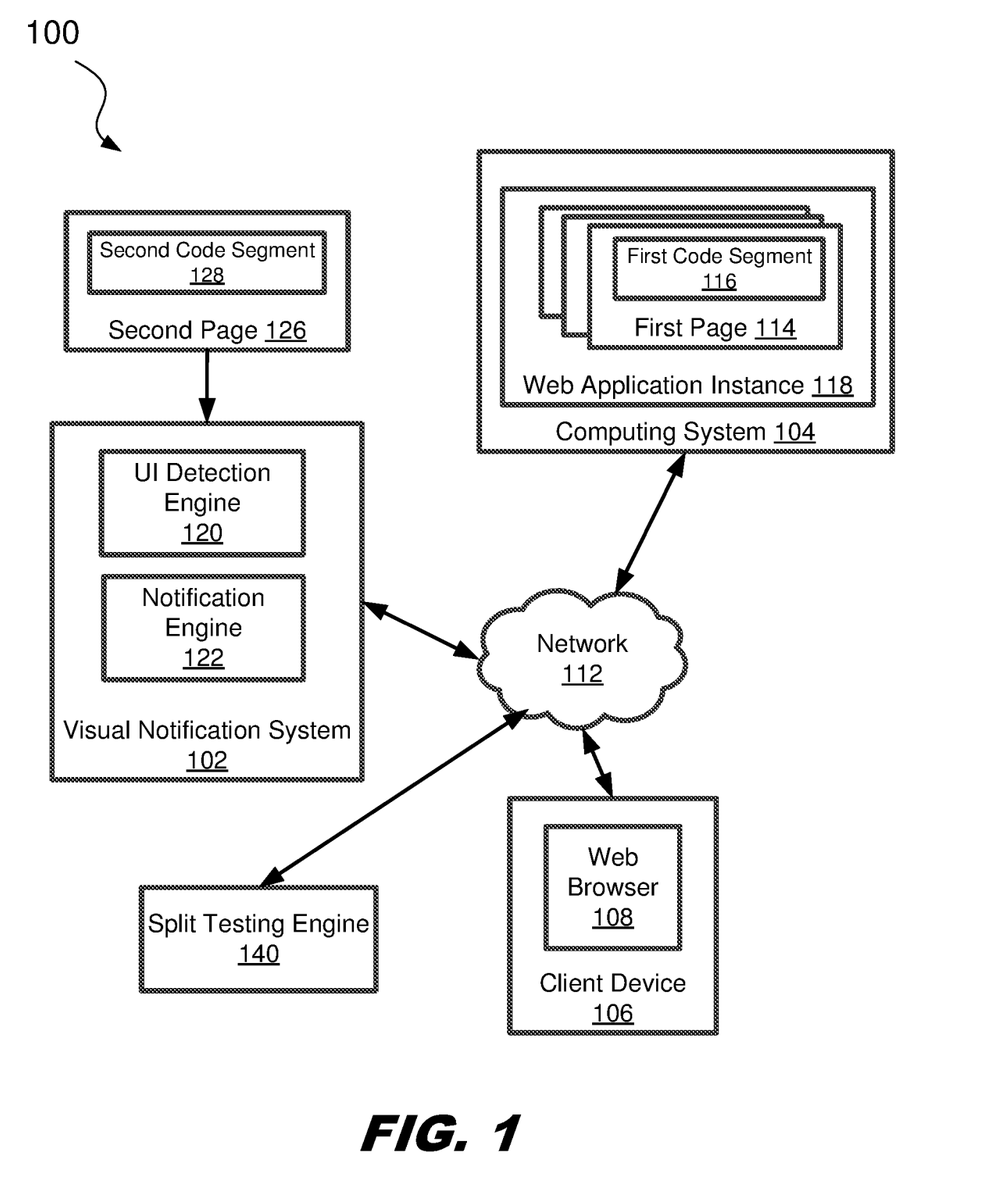
FIG. 1 is a block diagram illustrating an example system for providing a notification.

FIG. 1 is a block diagram illustrating an example system 100 for providing a notification. The system 100 includes a visual notification system 102, a computing system 104, and a client device 106 coupled over a network 112. The network 112 may be a private network (e.g., local area network (LAN), wide area network (WAN), intranet, etc.), a public network (e.g., the Internet), or a combination thereof. The network 112 may include various configurations and use various protocols including virtual private networks, WANS, LANs, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing. Although one computing system and one client device are illustrated in FIG. 1, this is not intended to be limiting, and system 100 may include more than one client device and more than one computing system.

The client device 106 may include a web browser 108 that locates, retrieves, and displays content on the World Wide Web, including webpages, images, video, text, and other files. In a client/server model, the web browser 108 is a software application running on the client device 106 that contacts a web server and requests information. The web browser 108 is designed for use with various web technologies such as HTTP, HTML, JavaScript, CSS, and other web technologies. HTML is a standard markup language for creating webpages and web applications. The web browser 108 may request information from a web application and may receive HTML pages from the server hosting the web application.

A web application may have a plurality of instances executing at any one time, serving multiple users, and may have different versions, as will be explained further below. A web application instance 118 of the web application may be accessible via the network 112 and hosted by the computing system 104. An administrator may deploy the web application instance 118 in the computing system 104. In an example, the computing system 104 may be a web server that provides webpages of the web application instance 118 to the web browser 108. The web application instance 118 may include a first page 114 (e.g., webpage) storing one or more code segments that the server provides to and is processed by the web browser 108.

It should be understood that a web application may include one or more webpages, and each webpage including one or more code segments. A code segment may correspond to one or more UI features. In an example, the first page 114 stores a first code segment 116 corresponding to a UI feature. A page may correspond to a UI feature if when processed, the page causes a UI feature or its attributes to be visually displayed on a screen coupled to a device. A UI feature may refer to an object that may be displayed to a user via a screen coupled to the client device 106. In an example, a UI feature may be a button, a visual effect of a webpage (e.g., background of a webpage), an image, text, user-selectable options (e.g., button, link, radio button, and so on), and so on. A UI feature may have configurable attributes, such as a color, a structure (e.g., page structure), font type, font size, shape, size, and so on. An attribute of a UI feature may be configured based on the first code segment, and the UI feature having the attribute may be displayed on the screen coupled to the client device 106.

In an example, the first code segment 116 may be an HTML code segment stored in an HTML document. The web browser 108 may parse the HTML code segments (e.g., HTML tags) and apply styling and formatting to an HTML document based on the instructions in the HTML tags. In another example, the first code segment 116 may be written in CSS stored in a CSS document and describe the style of an HTML document and/or how HTML elements should be displayed. In another example, the first code segment 116 may be JavaScript code that is provided to the web browser 108. The web browser 108 may load the first page 114 storing the JavaScript code and run it using a built-in interpreter. The web browser 108 renders, based on at least the first code segment 116, one or more UI features for display to a user on a display screen coupled to the client device 106. It should be understood that one or more code segments stored in the first page 114 and the second page 126 may be written in HTML, JavaScript, and/or CSS.

The visual notification system 102 includes a UI detection engine 120 and a notification engine 122. The visual notification system 102 may execute on any computing system having at least one memory and one processor. Although the visual notification system 102 is illustrated as being separate from the computing system 104, in other examples the visual notification system 102 executes in the same system hosting the web application instance (e.g., in computing system 104). Additionally, components of the visual notification system 102 (e.g., the UI detection engine 120 and the notification engine 122) may execute in the same or different computing systems.

A developer may modify the first code segment 116 stored in the first page 114 and accordingly generate a second page 126 including a second code segment 128. In an example, the first page 114 and the second page 126 are different versions of a webpage to be displayed to a user through an interactive UI (e.g., a web browser). The first code segment 116 and the second code segment 128 may be different versions of a UI feature. In some examples, the first code segment 116 and the second code segment 128 correspond to the same UI feature, with the UI feature having a first attribute in the first code segment 116, and the UI feature having a second attribute in the second code segment 128. The first attribute and the second attribute may be different relative to each other (e.g., different colors, sizes, shapes, structures, fonts, and so on). In some examples, the first code segment 116 and the second code segment 128 correspond to different UI features referencing the same uniform resource indicator (URI). In an example, the first code segment 116 may correspond to a user-selectable button, and a developer may modify the first code segment 116 by replacing the user-selectable button with a user-selectable link in the second code segment 128. The user-selectable button and the user-selectable link may reference the same URI in the different webpage versions.

After the second page 126 has been approved and merged into a repository used to build the web application, the second page 126 may be built into the application and sent to the system for deployment. Before the new version of the webpage is deployed, the visual notification system 102 may compare the different versions of the web application. In an example, the visual notification system 102 compares the first page 114 with the second page 126 to detect whether the second page 126 modifies a UI feature corresponding to the first page 114. The UI detection engine 120 may analyze the first page 114 and the second page 126. The UI detection engine 120 may detect one or more UI modifications based on comparing the first page 114 with the second page 126. In an example, the UI detection engine 120 may determine whether the first page 114 and the second page 126 are of a given type (e.g., CSS, HTML, a script including JavaScript code). A given type may be any document type that corresponds to or affects a UI feature. If the first page 114 and the second page 126 are of the given type and are different from one another (e.g., code has been modified from one version to another version), the UI detection engine 120 may detect a UI modification.

In an example, the UI detection engine 120 detects a modification if an attribute of a UI feature corresponding to the first code segment 116 is different from an attribute of the UI feature corresponding to the second code segment 128, where the second code segment 128 is a different version of the first code segment 116. An attribute may be, for example, a color, a structure (e.g., page structure), font type, font size, shape, size, and so on. In another example, the UI detection engine 120 detects a modification if text corresponding to the first code segment 116 is different from text corresponding to the second code segment 128, where the second code segment 128 is a different version of the first code segment 116.

In another example, the first code segment 116 is devoid of a UI feature rendered at a location on a display, and the UI detection engine 120 detects a modification if the second code segment 128 corresponds to the UI feature rendered at the location on the display. The first visual element may be an image, text, video, etc. In another example, a UI feature corresponding to the first code segment 116 is of a first type, and a UI feature corresponding to the second code segment 128 is of a second type. The first type and/or second type may be any combination of a user-selectable option (e.g., radio button, drop-down menu, a button, link), an input text field, etc. Additionally, or alternatively, the UI element may be a user-selectable option. In another example, the UI detection engine 120 detects a modification if text included in a UI corresponding to the first code segment 116 is different from text included in a UI corresponding to the second code segment 128. In this example, the first code segment 116 may correspond to a button including the text "Purchase," and the second code segment 128 may correspond to the button including the text "Buy."

In response to the UI detection engine 120 detecting a UI modification based on comparing the first page 114 and the second page 126, the notification engine 122 may provide a notification of the UI modification. In an example, the notification engine 122 may provide the notification to an administrator for review. The administrator may accordingly be notified of the UI modification and determine whether to perform split testing based on the different versions of the web application. The notification engine 122 may request user input from the administrator regarding whether to perform split testing on the different web application versions. The notification engine 122 may provide the notification in a variety of ways. In an example, the notification engine 122 transmits the notification via a command language interpreter (e.g., shell). In another example, the notification engine 122 transmits the notification to the administrator via a dialogue box that appears on a display coupled to the visual notification system 102. The notification engine 122 may transmit the notification to the administrator in a variety of ways such as e-mail, pager, telephone call, or social media alert. Other ways to notify for the administrator are within the scope of the disclosure.

Different companies may have different policies and UI modifications that they desire to track. In an example, the administrator provides the visual notification system 102 with a white list of UI modifications of which the administrator desires to be informed. In this example, if the detected UI modification is included in the white list, the notification engine 122 sends the notification to the administrator or to the split testing engine 140 to perform split testing on the different web application versions. In another example, the administrator provides the visual notification system 102 with a black list of UI modifications of which the administrator does not want to be informed. In this example, if the UI modification is included in the black list, the notification engine 122 does not send a notification of the UI modification. If the modification is not included in the black list, the notification engine 122 sends the notification to the administrator or to the split testing engine 140 to perform split testing on the different web application versions.

In response to a first user input indicating a preference for no split testing from the administrator, no split testing based on the detected UI modification is performed. In response to a second user input indicating a preference for split testing from the administrator, the notification engine 122 may execute a machine-readable instruction that causes a first request from the client device 106 to be diverted to a first internet address associated with the first page 114 and causes a second request from a second client device to be diverted to a second internet address associated with the second page 126. The first page 114 included in the web application instance 118 (a first version of the web application) may be hosted at the first internet address, and the second page 126 included in another version of the web application may be hosted at the second internet address. In an example, the split testing engine 140 may receive the notification from the notification engine 122 and perform split testing based on the different versions of the web application.

In another example, the notification engine 122 provides the notification of the UI modification to the split testing engine 140, where providing the notification may include executing a machine-readable instruction that causes a first request from the client device 106 to be diverted to the first internet address and causes a second request from another client device to be diverted to the second internet address. In this example, the notification engine 122 may automatically trigger the split testing engine 140 to perform split testing based on the different versions of the web application.

Figure 2:
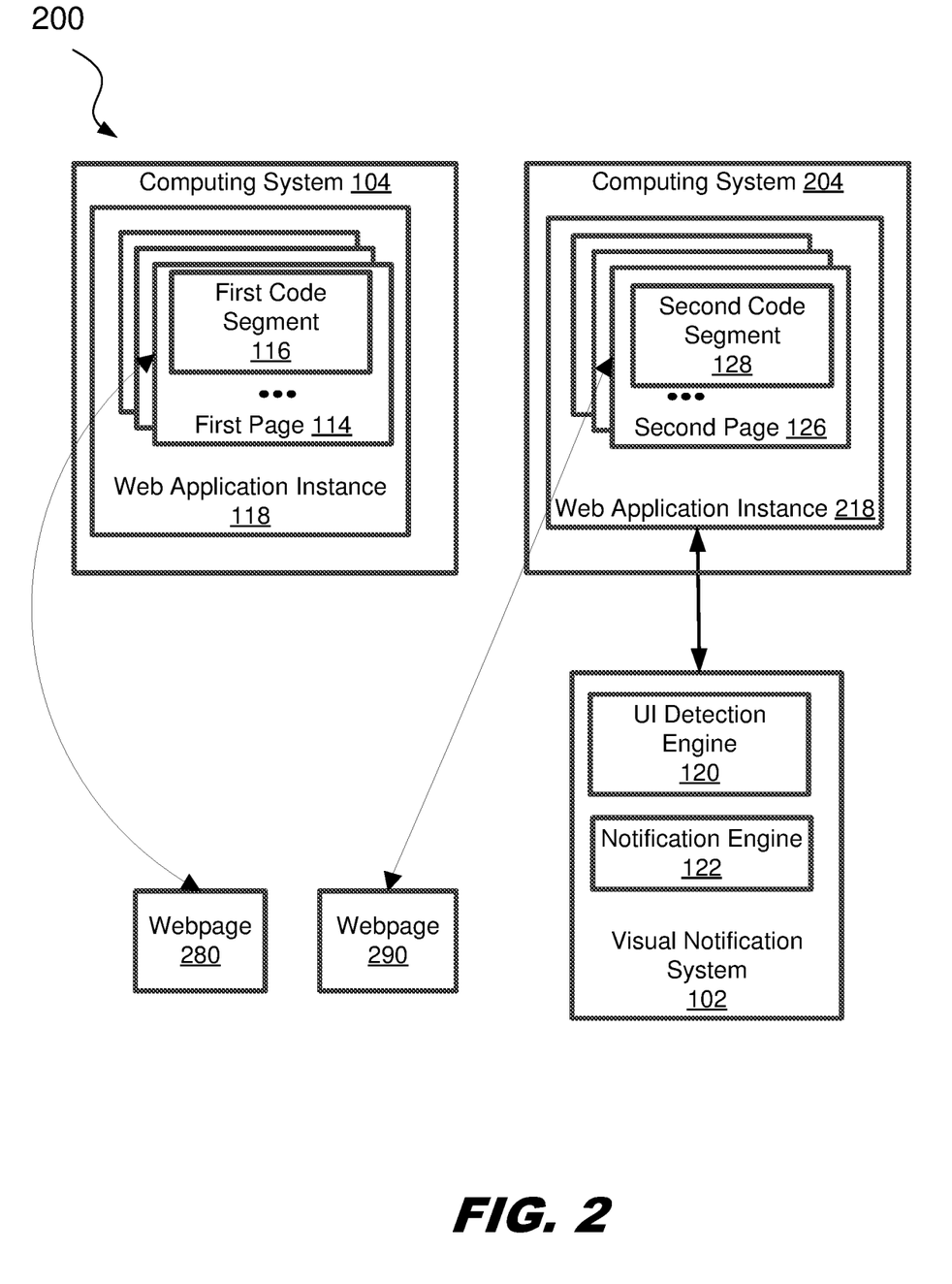
FIG. 2 is a block diagram illustrating an example system for providing a notification.

After a determination of whether to perform split testing based on the different versions of the web application is performed, the version of the web application including the second code segment 128 may be deployed in the production environment. If split testing is performed, the split testing engine 140 may divert a first percentage or first proportion of the web traffic to the web application instance 118 including the first code segment 116 and divert a second percentage or second proportion of the web traffic to the web application instance 218 including the second code segment 128. In an example, the split testing engine 140 diverts fifty percentage of the traffic to the web application instance 118 and fifty percentage of the traffic to the web application instance 218. In another example, the split testing engine 140 diverts forty percentage of the traffic to the web application instance 118 and sixty percentage of the traffic to the web application instance 218. The percentages may vary depending on the company policy and/or administrator's goals. The web application instance 118 and the web application instance 218 are instances of the same web application. The split testing engine 140 may analyze the users' behaviors when interacting with each of these code segments and collect statistics. The split testing engine 140 may collect, based on the split testing, a conversion rate based on the first and the second code segments.

FIG. 2 is a block diagram illustrating an example system 200 for providing a notification. In FIG. 2, the web application instance 118 and a web application instance 318 are different versions of the web application. The web application instance 118 including the first page 114 may be deployed in a production environment provided by the computing system 104. The web application instance 218 including the second page 126 may be deployed in a production environment provided by a computing system 204. Although the web application instances 118 and 218 are illustrated as executing on two different computing systems, it should be understood that in other examples, the web application instances 118 and 218 may execute in the same computing system.

In some examples, the web application instance 118 and the web application instance 218 include the same code, with the exception of the first code segment 116 and the second code segment 128. The second code segment 128 may be an updated version and/or different version of the first code segment 116. The first page 114 includes the first code segment 116 and corresponds to a webpage 280 (shown in FIG. 3A). The second page 126 includes the second code segment 128 and corresponds to a webpage 290 (shown in FIG. 3B).

Figure 3A:
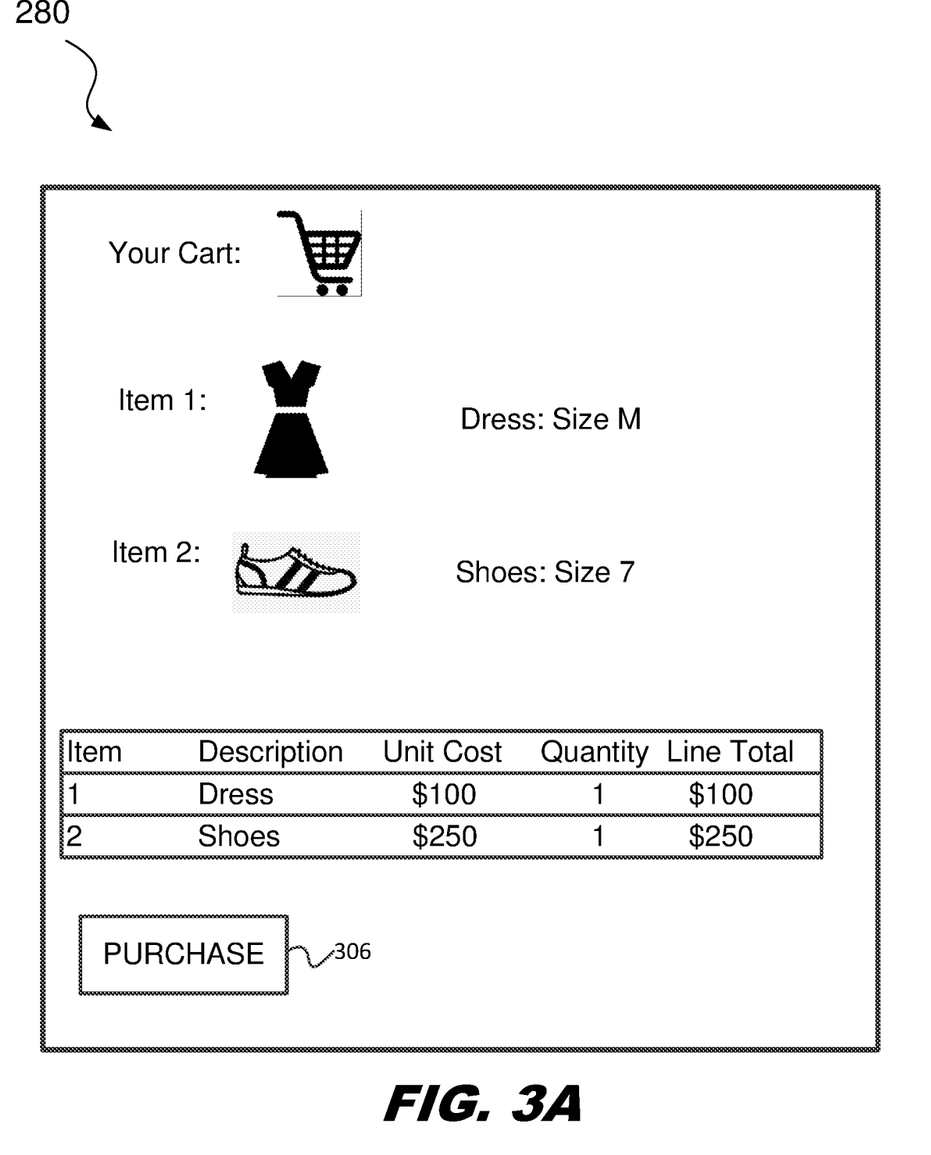
FIGS. 3A and 3B show examples of different versions of a webpage.
Figure 3B:
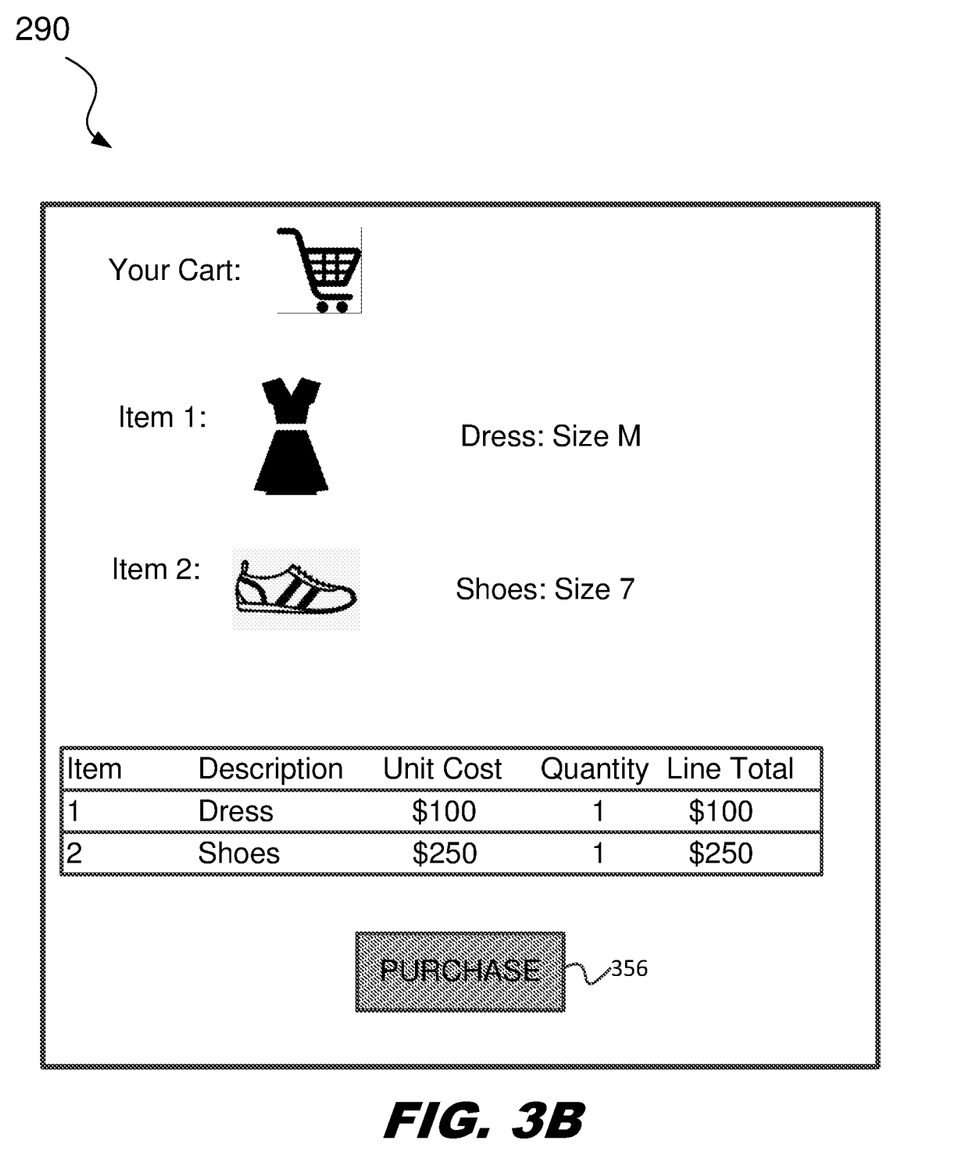

FIGS. 3A and 3B are example webpages corresponding to different versions of a web application. FIGS. 3A and 3B show examples of different versions of a webpage. Referring to FIG. 2 and FIG. 3A, the first page 114 may include the first code segment 116 corresponding to a UI feature 306, which is a button labeled "PURCHASE" and having an attribute of the color white. Referring to FIG. 2 and FIG. 3B, the second page 126 may include the second code segment 128 corresponding to a UI feature 356, which is a button labeled "PURCHASE" and having an attribute of the color gray. In FIGS. 3A and 3B, webpage 290 is a different version of the webpage 280. Other examples are also within the scope of the disclosure. For example, a UI attribute in addition to or different from the color attribute may be different between the two versions. For example, a UI feature may be the background of the webpage. In this example, an attribute of this UI feature corresponding to the webpage 280 may be white, and an attribute of this UI feature corresponding to the webpage 290 may be blue. Additionally or alternatively, the UI feature corresponding to the different versions of a webpage may be different. For example, the UI feature 306 may be a button, and the UI feature 356 may be a link or other user-selectable option. The UI feature corresponding to the first code segment 116 may be modified by the second code segment 128 in a different version of the web application.

The components illustrated in FIGS. 1 and 2 are examples and are not intended to be limiting. For example, FIG. 2 shows different versions of a web application (e.g., web application instance 118 and web application instance 218) that may be provided to a user. In another example, different versions of a microservice are analyzed by the visual notification system 102. A first version of a microservice includes the first code segment 116, and a second version of the microservice includes the second code segment 128. In an example, a first microservice instance includes the first code segment 116, and a second microservice instance includes the second code segment 128. The second code segment 128 may be an updated version and/or different version of the first code segment 116. In another example, different versions of a mobile application are analyzed by the visual notification system 102. A first version of a mobile application includes the first code segment 116, and a second version of the mobile application includes the second code segment 128. In an example, a first mobile application instance includes the first code segment 116, and a second mobile application instance includes the second code segment 128.

In some examples, a first executable file includes the first page 114 and/or the first code segment 116, and a second executable file includes the second page 126 and/or the second code segment 128. In this example, the first page 114 and the second page 126 may be written in Javascript. In some examples, the first page 114 and the second page 126 are written in a document markup language. In this example, the first page 114 and the second page 126 may be written in HTML, extensible markup language (XML), or CSS, or other language capable of modifying a UI feature.

Figure 4:
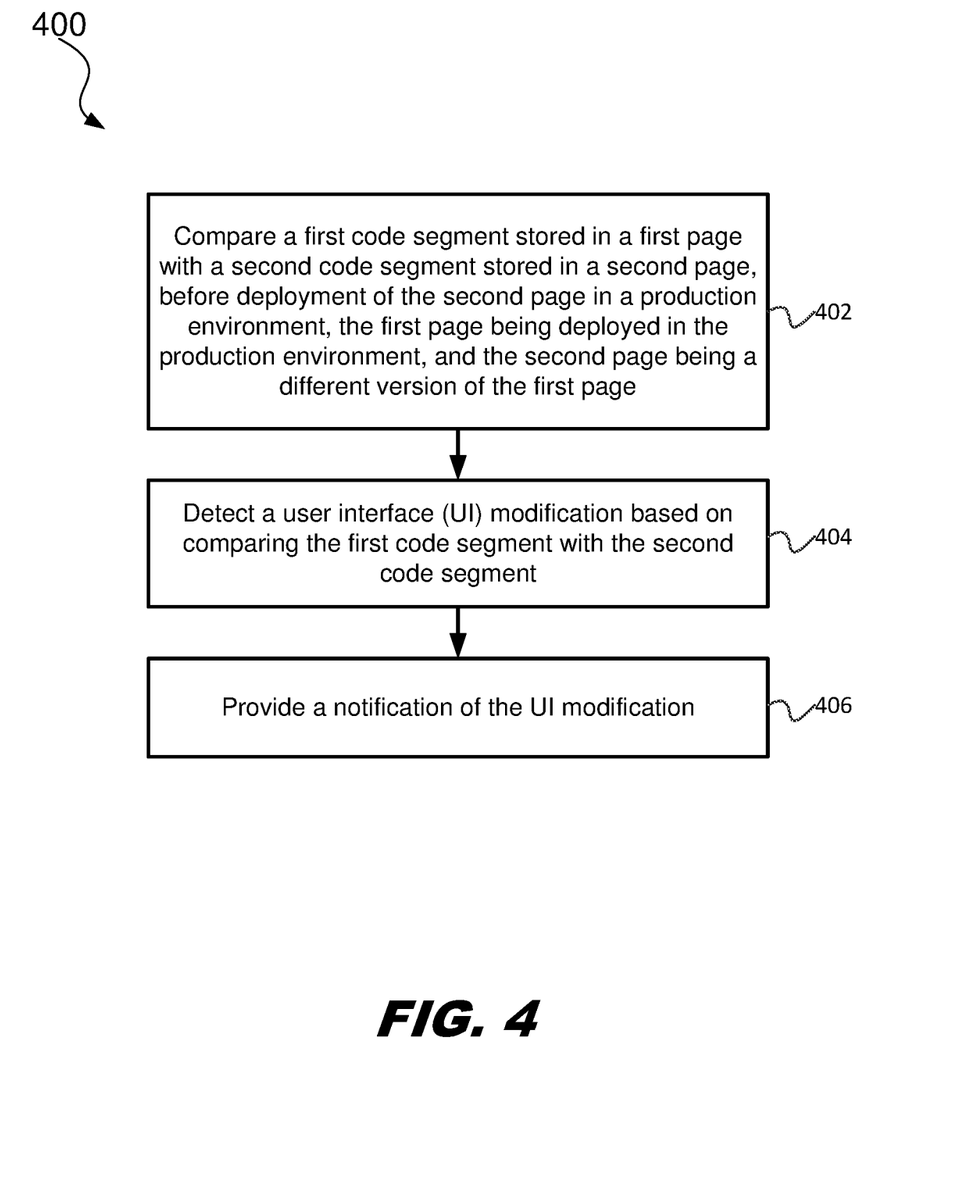
FIG. 4 is a flow diagram of a method for providing a notification.

FIG. 4 is a flow diagram of a method 400 for providing a notification. Actions of the method 400 can be executed by a computing device (e.g., a processor, processing circuit, and/or other suitable component) or other suitable means for performing the actions. For example, a computing device may utilize one or more components (e.g., UI detection engine 120 and/or notification engine 122) to execute the actions of the method 400. As illustrated, the method 400 includes a number of enumerated actions, but examples of the method 400 may include additional actions before, after, and in between the enumerated actions. In some examples, one or more of the enumerated actions may be omitted or performed in a different order.

At step 402, the method 400 includes comparing a first code segment stored in a first page with a second code segment stored in a second page, before deployment of the second page in a production environment, the first page being deployed in the production environment, and the second page being a different version of the first page. In an example, the web application instance 118 includes the first page 114 and the web application instance 218 includes the second page 126, where the web application instance 118 and the web application instance 218 are different versions of the web application. The web application instance 118 and the web application instance 218 may include the same code, with the exception of the first page 114 and the second page 126.

At step 404, the method 400 includes detecting a UI modification based on comparing the first code segment with the second code segment. Before the web application instance 218 is deployed, the visual notification system 102 processes and analyzes the different versions of the web application. The second code segment may be a different version of the first code segment. In an example, the first code segment 116 and the second code segment 128 correspond to the same UI feature, having different attributes within the code segments. In another example, the first code segment 116 and the second code segment 128 correspond to the different UI features that reference the same URI.

At step 406, the method 400 includes providing a notification of the UI modification. The web application instance including the second page may be deployed in the production environment. The notification engine 122 may execute a machine-readable instruction that causes a first request to be diverted to a first internet address associated with the first page and causes a second request to be diverted to a second internet address associated with the second page. In an example, the computing system 104 hosting the web application instance 118 may be accessed via the first internet address, and the computing system 204 hosting the web application instance 218 may be accessed via the second internet address.

It is also understood that additional processes may be inserted before, during, or after actions 402-406 discussed above. It is also understood that one or more of the actions of method 400 described herein may be omitted, combined, or performed in a different sequence as desired.

Figure 5:
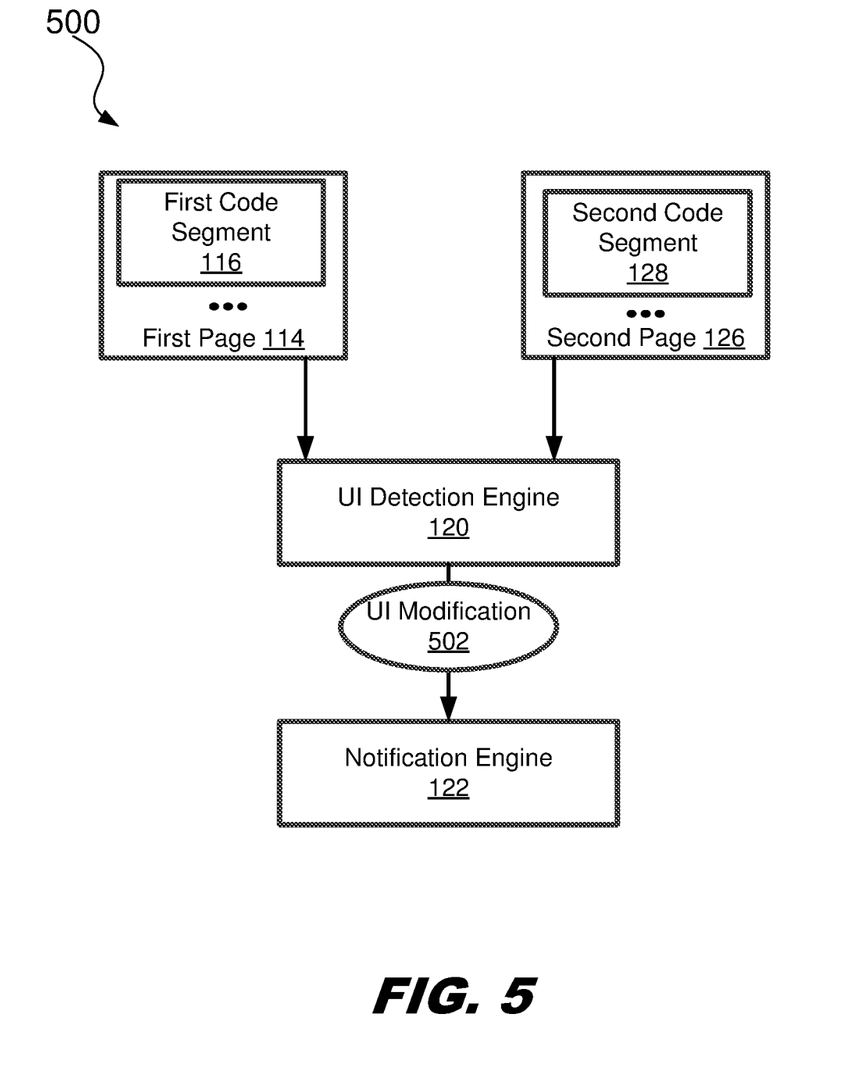
FIG. 5 is an example system diagram for providing a notification.

FIG. 5 is an example system diagram 500 for providing a notification. In FIG. 5, the UI detection engine 120 compares the first code segment 116 stored in the first page 114 with the second code segment 128 stored in the second page 126, before deployment of the second page 126 in a production environment. The first page 114 may be deployed in the production environment, and the second page 126 may be a different version of the first page 114. The UI detection engine 120 may detect a UI modification 502 based on comparing the first code segment 116 with the second code segment 128. The UI detection engine 120 may inform the notification engine 122 of any UI modifications based on comparing the first code segment 116 with the second code segment 128.

The notification engine 122 may provide a notification of the UI modification. The notification engine 122 may execute a machine-readable instruction that causes a first request to be diverted to a first internet address associated with the first page and causes a second request to be diverted to a second internet address associated with the second page. The web application instance 118 including the first page 114 may be accessed via the first internet address, and the web application instance 218 including the second page 126 may be accessed via the second internet address.

Figure 6:
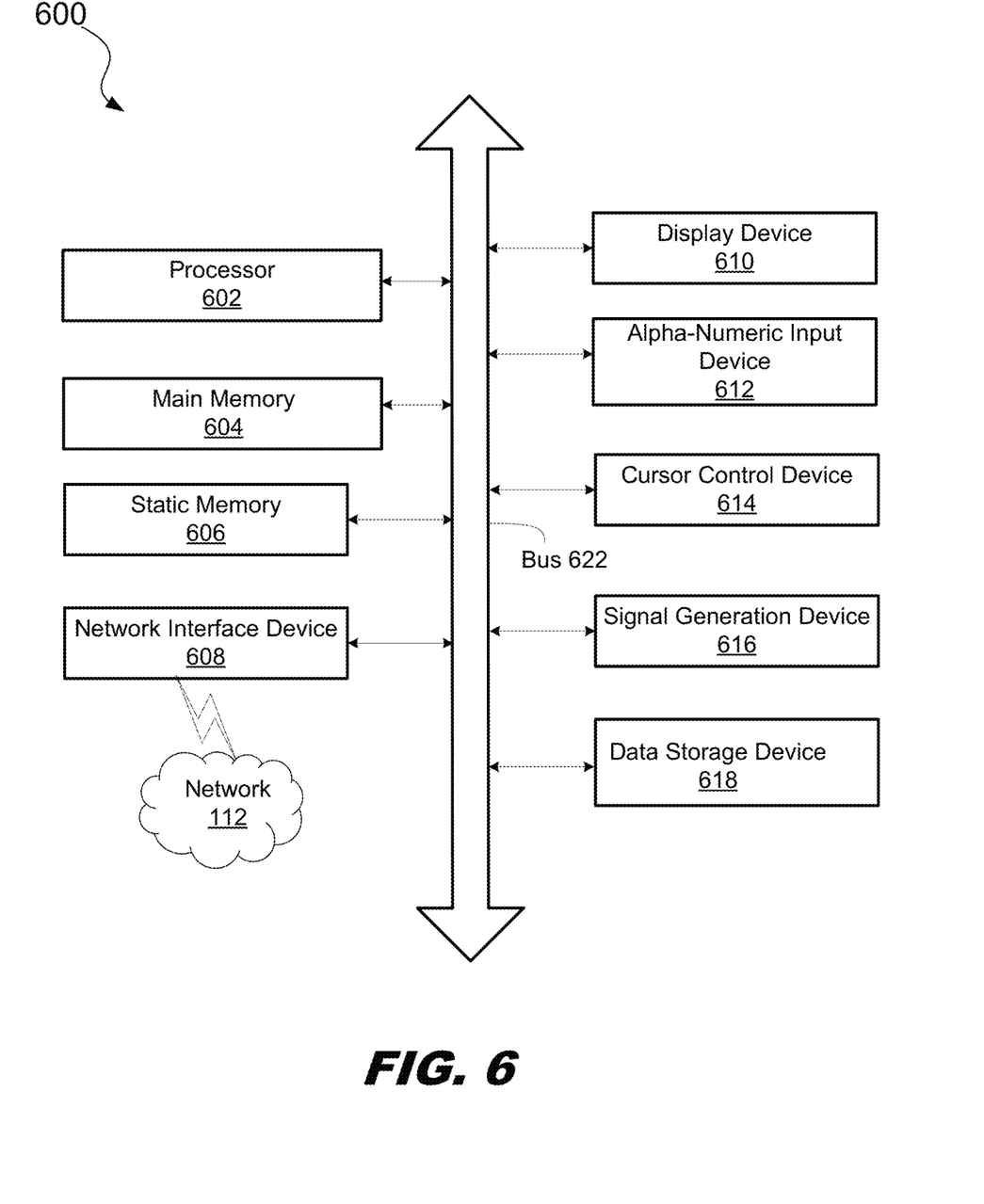
FIG. 6 illustrates a system diagram of an example machine that may perform one or more of the operations described herein.

FIG. 6 illustrates a system diagram of a machine 600 within which a set of instructions, for causing the machine to perform any one or more of the methodologies discussed herein, may be executed in the example form of a computing system and/or client device. The machine 600 may be connected (e.g., networked) to other machines in a local area network (LAN), an Intranet, an extranet, or the Internet. The machine 600 may operate in the capacity of a server or a client machine in a client-server network environment, or as a peer machine in a peer-to-peer (or distributed) network environment. The machine 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, the machine 600 includes a processor 602, main memory 604, static memory 606, and a data storage device 618, which communicate with each other via a bus 622. A "processor" may also be referred to as a "central processing unit" ("CPU") or "physical processor" herein. The processor 602 may refer to a device capable of executing instructions encoding arithmetic, logical, or input/output (I/O) operations. The processor 602 represents one or more general-purpose processing devices such as a microprocessor, central processing unit (CPU), or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), a network processor, or the like.

In an example, the processor 602 may follow the Von Neumann architectural model and may include an arithmetic logic unit (ALU), a control unit, and a plurality of registers. In a further aspect, the processor 602 may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket). The processor 602 is configured to execute instructions for performing the operations, actions, and steps discussed herein (e.g., the method 400 discussed in relation to FIG. 4).

The memory may be one or more of many different types of memory. "Memory" herein may refer to volatile or non-volatile memory, such as random-access memory (RAM), ROM, electrically erasable ROM (EEPROM), or any other memory capable of storing data. Some types of memory, such as solid-state drives typically have relatively larger storage volume but relatively slower performance. Other types of memory, such as those used for RAM, are optimized for speed and may be referred to as "working memory." The various types of memory may store information in the form of software and data. The software may include an operating system and various other software applications. Main memory 604 may be, for example, ROM, flash memory, dynamic random-access memory (DRAM) such as synchronous DRAM (SDRAM), double data rate (DDR SDRAM), or DRAM (RDRAM), and so forth. Static memory 606 may be, for example, flash memory, static random-access memory (SRAM), and so forth.

The machine 600 may further include a network interface device 608, an alphanumeric input device 612 (e.g., a keyboard) that accepts input from a user, a cursor control device 614 (e.g., a mouse) that accepts input from a user, a signal generation device 616 (e.g., a speaker), and a display device 610. In an example, an administrator may provide via the input device 612 user input that causes the split testing engine 140 to perform split testing based on a UI modification. In an example, the administrator may provide via the input device 612 user input indicating that the administrator does not desire the split testing engine 140 to perform split testing based on a UI modification.

The display device 610 may be a physical display device that displays data processed by the machine 600. The physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display, or another type of display unit. The display may be physically attached to the machine 600 or separate from and physically coupled via a wired or wireless connection to the machine 600. In an example, the display device 610 is part of, and integrated into, the machine 600 (e.g., a screen of the computing system and/or the client device). The display device 610 may be sold with and attached to the computing system and/or the client device such that when a user views content via the computing system and/or the client device, the content is displayed on the display device 610. It will be appreciated that other physical display devices are contemplated, and that the various types named herein are not limiting. For example, webpages may be displayed to a user via the display device 610.

The data storage device 618 may include a computer-readable storage medium that stores one or more sets of instructions (e.g., software) embodying any one or more of the methodologies or functions described herein. The instructions may also reside, completely or at least partially, within main memory 604 and/or within the processor 602 during execution thereof by the machine 600. Additionally, the main memory 604 and the processor 602 may also constitute computer-readable storage media. The instructions may further be transmitted or received over the network 112 via the network interface device 608. While the data storage device 618 is shown in an example to be a single medium, the term "data storage device" should be taken to include a single medium or multiple media (e.g., a centralized or distributed database, and/or associated caches and servers) that store the one or more sets of instructions. The term "computer-readable storage medium" may also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Some portions of the detailed description have been presented in terms of algorithms and symbolic representations of operations on data bits within a computer memory. An algorithm is here, and generally, conceived to be a self-consistent sequence of steps or actions leading to a desired result. The steps or actions are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change, and substitution is contemplated in the foregoing disclosure and in some instances, some features of the disclosure may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the disclosure disclosed herein.

What is claimed is:

1. A method performed by a computing system, the method comprising:
    deploying a first webpage in a production environment associated with the computing system, wherein the first webpage is part of a web application instance that, while in the production environment, executes on the computing system to provide a first graphical element within a display of a web browser on a client device, the first webpage corresponding to a first code segment;

receiving a second code segment corresponding to a second webpage, the second code segment, when deployed, providing a second graphical element within the display of the web browser on the client device;

merging the second webpage into a repository used to build a web application corresponding to the web application instance;

prior to deployment of the second webpage in the production environment and while the first webpage is in the production environment, automatically comparing the first code segment stored in the first webpage with the second code segment stored in the second webpage;

automatically detecting a user interface (UI) modification based on comparing the first code segment with the second code segment to determine if text corresponding to the first code segment is different than text corresponding to the second code segment, wherein the UI modification corresponds to a visual differentiation between the first graphical element and the second graphical element within the display of the web browser on the client device;

in response to detecting the modification, comparing the detected modification to a list of a plurality of disapproved modifications, the list of the plurality of disapproved modifications being predefined by a user;

wherein when the detected modification is not included on the list of the plurality of disapproved modifications, providing a notification of the detected modification to a split testing engine; and with the split testing engine, performing split testing on the first graphical element of the first webpage and the second graphical element of the second webpage in response to receiving the notification.

2. The method of claim 1, wherein the first graphical element corresponds to a first UI feature.

3. The method of claim 2, wherein the second graphical element corresponds to a second UI feature different from the first UI feature.

4. The method of claim 3, wherein the first UI feature is of a first type, and the second UI feature is of a second type different from the first type.

5. The method of claim 3, wherein an attribute of the first UI feature is different from an attribute of the second UI feature.

6. The method of claim 5, wherein the attribute is at least one of a color, an image, a page structure, a font type, a font size, or a shape.

7. The method of claim 1, wherein the first code segment is devoid of a first UI feature rendered at a location on a display, and the second code segment corresponds to the first UI feature rendered at the location on the display.

8. The method of claim 1, comprising:
deploying a web application instance including the second webpage in the production environment.

9. A system for providing a notification, the system comprising:
a processor; and
a memory comprising machine readable instructions that when executed by the processor, cause the system to:
deploy a first webpage in a production environment, wherein the first webpage is part of a web application instance that, while in the production environment, executes on the processor to provide a first graphical element within a display of a web browser on a client device, the first webpage corresponding to a first code segment;

receive a second code segment corresponding to a second webpage, the second code segment, when deployed, providing a second graphical element within the display of the web browser on the client device;

prior to deployment of the second webpage in the production environment and while the first webpage is in the production environment, automatically compare the first code segment stored in the first webpage with the second code segment stored in the second webpage merge the second webpage into a repository used to build a web application corresponding to the web application instance;

automatically detect a user interface (UI) modification based on comparing the first code segment with the second code segment to determine if text corresponding to the first code segment is different than text corresponding to the second code segment, wherein the UI modification corresponds to a visual differentiation between the first graphical element and the second graphical element within the display of the web browser on the client device;

in response to detecting the modification, compare the detected modification to a list of a plurality of disapproved modifications, the list of the plurality of disapproved modifications being predefined by a user;

wherein when the detected modification is not included on the list of the plurality of disapproved modifications, provide a notification of the detected modification to a split testing engine; and perform split testing on the first graphical element of the first webpage and the second graphical element of the second webpage.

10. The system of claim 9, wherein a first web application instance includes the first code segment, and a second web application instance includes the second code segment.

11. The system of claim 9, wherein a first mobile application instance includes the first code segment, and a second mobile application instance includes the second code segment.

12. The system of claim 9, wherein a first microservice instance includes the first code segment, and a second microservice instance includes the second code segment.

13. The system of claim 9, wherein a first executable file includes the first webpage, and a second executable file includes the second webpage.

14. The system of claim 13, wherein the first and second code segments are written in Javascript.

15. The system of claim 9, wherein the first and second code segments are written in a document markup language.

16. The system of claim 9, wherein the first code segment corresponds to a first UI feature, and the second code segment corresponds to a second UI feature different from the first UI feature.

17. The system of claim 16, wherein the first UI feature is of a first type, and the second UI feature is of a second type different from the first type.

18. The system of claim 17, wherein the first type is at least one of a user-selectable option or an input text field.

19. The system of claim 9, wherein the first and second code segments correspond to a first UI feature having different attributes based on the first and second code segments, wherein an attribute is at least one of a color, an image, a page structure, a font type, a font size, or a shape.

20. A non-transitory machine-readable medium comprising a plurality of machine-readable instructions that when executed by one or more processors is adapted to cause the one or more processors to perform a method comprising:

deploying a first webpage in a production environment, wherein the first webpage is part of a web application instance that, while in the production environment, executes on a computing system to provide a first graphical element within a display of a web browser on a client device, the first webpage corresponding to a first code segment;

receiving a second code segment corresponding to a second webpage, the second code segment, when deployed, providing a second graphical element within the display of the web browser on the client device;

merging the second webpage into a repository used to build a web application corresponding to the web application instance;

prior to deployment of the second webpage in the production environment and while the first webpage is in the production environment, automatically comparing the first code segment stored in the first webpage with the second code segment stored in the second webpage;

automatically detecting a user interface (UI) modification based on comparing the first code segment with the second code segment to determine if text corresponding to the first code segment is different than text corresponding to the second code segment, wherein the UI modification corresponds to a visual differentiation between the first graphical element and the second graphical element within the display of the web browser on the client device;

in response to detecting the modification, comparing the detected modification to a list of a plurality of disapproved modifications, the list of the plurality of disapproved modifications being predefined by a user;

wherein when the detected modification is not included on the list of the plurality of disapproved modifications, providing a notification of the detected modification to a split testing engine; and performing split testing on the first graphical element of the first webpage and the second graphical element of the second webpage.

* * * * *